(12) United States Patent
Smith et al.

(10) Patent No.: US 7,937,772 B1
(45) Date of Patent: May 10, 2011

(54) CHEMICAL/BIOLOGICAL PROTECTIVE GARMENTS AND LAMINATES

(75) Inventors: Novis Smith, Philadelphia, PA (US); Charles Roberson, Greensboro, NC (US)

(73) Assignee: Lakeland Industries, Inc. NY (US)

( * ) Notice: Subject to any disclaimer, the term of this patent is extended or adjusted under 35 U.S.C. 154(b) by 0 days.

(21) Appl. No.: 12/657,804

(22) Filed: Jan. 28, 2010

(51) Int. Cl.
*A41D 13/02* (2006.01)
*A62B 17/00* (2006.01)
*A41D 13/00* (2006.01)

(52) U.S. Cl. .................... 2/69; 2/455; 2/457; 2/79; 2/82

(58) Field of Classification Search .............. 2/901, 272, 2/227, 93, 97, 85, 87, 79, 82, 69, 48, 49.4, 2/457, 456
See application file for complete search history.

(56) References Cited

U.S. PATENT DOCUMENTS

| | | | | |
|---|---|---|---|---|
| 3,856,598 A * | 12/1974 | Gregorian et al. | ............. | 156/85 |
| 3,874,964 A * | 4/1975 | Cogliano et al. | ................ | 156/78 |
| 4,147,844 A * | 4/1979 | Babinsky et al. | ............... | 521/27 |
| 4,726,986 A * | 2/1988 | Cannady et al. | ............. | 442/126 |
| 4,879,165 A * | 11/1989 | Smith | ........................... | 428/212 |
| 4,981,738 A * | 1/1991 | Farnworth et al. | ............. | 428/55 |
| 5,002,820 A * | 3/1991 | Bolton et al. | ................ | 428/215 |
| 5,037,700 A * | 8/1991 | Davis | .......................... | 428/414 |
| 5,061,748 A * | 10/1991 | Bolton et al. | ................ | 524/827 |
| 5,098,770 A * | 3/1992 | Paire | ........................... | 428/198 |
| 5,124,208 A * | 6/1992 | Bolton et al. | ................ | 428/412 |
| 5,166,007 A * | 11/1992 | Smith et al. | ..................... | 428/63 |
| 5,236,769 A * | 8/1993 | Paire | ............................ | 428/196 |
| 5,491,022 A * | 2/1996 | Smith | ............................ | 442/50 |
| 5,492,108 A * | 2/1996 | Smith et al. | ............... | 128/201.15 |
| 5,494,720 A * | 2/1996 | Smith et al. | .................... | 428/57 |
| 5,496,640 A * | 3/1996 | Bolton et al. | ................ | 428/421 |
| 5,554,667 A * | 9/1996 | Smith et al. | ..................... | 522/81 |
| 5,688,577 A * | 11/1997 | Smith et al. | ................... | 428/113 |
| 5,692,935 A * | 12/1997 | Smith | ............................ | 442/38 |
| 5,763,062 A * | 6/1998 | Smith et al. | ................... | 428/215 |
| 6,302,993 B1 * | 10/2001 | Smith et al. | ................ | 156/306.6 |
| 6,364,980 B1 * | 4/2002 | Smith et al. | .................. | 156/108 |
| 6,671,031 B1 * | 12/2003 | Nishimura | ................... | 349/201 |
| 6,803,034 B2 * | 10/2004 | DuVal et al. | ................ | 424/76.2 |
| 6,808,791 B2 * | 10/2004 | Curro et al. | .................. | 428/198 |
| 7,093,307 B1 * | 8/2006 | Smith | ............................. | 2/457 |
| 7,358,295 B2 * | 4/2008 | Miller et al. | .................. | 524/507 |
| 7,718,555 B1 * | 5/2010 | Smith et al. | ..................... | 442/50 |
| 2001/0008695 A1 * | 7/2001 | Bolton et al. | ................ | 428/442 |
| 2002/0028876 A1 * | 3/2002 | Jenkines et al. | ............. | 524/591 |
| 2002/0091074 A1 * | 7/2002 | Wooley et al. | .................... | 514/1 |
| 2002/0115581 A1 * | 8/2002 | DuVal et al. | ................. | 510/276 |
| 2002/0155302 A1 * | 10/2002 | Smith et al. | ................. | 428/442 |
| 2002/0164465 A1 * | 11/2002 | Curro et al. | .................. | 428/198 |
| 2003/0044579 A1 * | 3/2003 | Bolton et al. | ................ | 428/167 |
| 2003/0082445 A1 * | 5/2003 | Smith et al. | .................. | 429/176 |
| 2003/0082972 A1 * | 5/2003 | Monfalcone et al. | ......... | 442/138 |
| 2004/0096666 A1 * | 5/2004 | Knox et al. | ................. | 428/412 |
| 2006/0046022 A1 * | 3/2006 | Bader et al. | .................. | 428/102 |
| 2009/0061131 A1 * | 3/2009 | Monfalcone et al. | ........ | 428/35.6 |
| 2009/0294294 A1 * | 12/2009 | Feng et al. | .................... | 205/125 |
| 2010/0055472 A1 * | 3/2010 | Bravet et al. | .................. | 428/422 |

* cited by examiner

*Primary Examiner* — Bobby H Muromoto, Jr.
(74) *Attorney, Agent, or Firm* — John Lezdey

(57) ABSTRACT

A breathable protective garment or laminate for protection against chemical and/or biologic agents which contains one or more scrim layers which contain anti-microbial and/or anti toxic chemical agents. The garment or laminate is also self-decontaminating.

17 Claims, No Drawings

CHEMICAL/BIOLOGICAL PROTECTIVE GARMENTS AND LAMINATES

FIELD OF THE INVENTION

The present invention relates to breathable protective garments and laminates which can be used for protection against chemical and/or biologic agents. More particularly, there is provided protective laminates or garments that are breathable but have a vapor barrier and are self decontaminating.

BACKGROUND OF THE INVENTION

Prior breathable fabrics have been prepared with active absorptive carbon to absorb chemical agents and/or other absorptive chemical. These garments are still uncomfortable after long use and can be deactivated by ambient air and moisture prior to use if not kept sealed. Also after use, these garments constitute a toxic hazard until decontaminated or burned.

There are suits that offer a high degree of protection to the wearer that are limited to only chemical or biological agent protection which during use over 20 minutes become hot and uncomfortable. The build-up of heat inside a protective suite is an important issue, not only from the point of comfort but also from the point of view of safety. It is generally accepted that, if the core body temperature of the wearer rises by more than 1° C., he/she is at risk of heat stress which is dangerous and can even result in death.

U.S. Pat. No. 4,409,761 to Langley discloses a breathable non-woven composite fabric having barrier capabilities to biological fluids comprising an outer polypropylene microporous thermoplastic film bonded to a non-woven layer by ultrasonic point bonding, which is herein incorporated by reference.

U.S. Patent Application No. 20040121678 to Baldwin et al, which is herein incorporated by reference discloses a liquid and pathogen impervious laminate having a fibrous layer adhesively bonded to a breathable layer. The fibrous layer can be prepared by spunbonding, meltblowing and spunlacing techniques. However, the fibrous does not have biocide properties but can only block biocide penetration. The application also discusses various bonding techniques including the discontinuous coating of adhesives.

It is known that certain chemical compounds can chemically deactivate toxic chemical agents. Reactive agents can be in the form of:

1) Polyamine chemicals which react with reactive halogen compounds such as mustard gas, and phosphorous nerve agents. These polyamine compounds will also react irreversibly with all acidic chemicals and gases from sulfur dioxide, chlorine, bromine, hydrogen sulfide, to carbon dioxide to HF and acetic acid.

The polyamine can also be incorporated onto an acidic powdered in the same manner as above such as a sulfonic acid ion exchange resin, or powders containing maleic acid or sulfonic acids. Additional other salts can be made as powders or liquids to anchor down the reactive polyamine by reacting the polyamine with acids such as acetic acid, citric acid, phthalic acid and many more. Polyamines can be used to deactivate mustard gas and some nerve gases by attacking phosphorous or halogen sites.

2) Ammonium salts such as ammonium carbonate create a small vapor pressure of reactive ammonia above it and therefore in the reactive layer. Other reactive salts include those which are acidic such as ammonium dihydrogen phosphate or monoammonium sulfate. These are acidic salts which can react with basic chemical vapors such as ammonia and amines.

3) Reducing agents which will react with nitric oxide, nitrogen tetroxide, bromine, chlorine, and fluorine.

4) A layer or coating of cuprous salts or possibly ferrous or zinc salts will also react with sulfur and phosphorus containing vapors. (Mercury, cobalt and nickel salts are too toxic to incorporate into the reactive inner layer of these reactive suits).

SUMMARY OF THE INVENTION

The present invention relates to breathable chemical and biological agent protective garments and laminates. More particularly there is provided garments and laminates which have barrier layers of fabrics designated to prevent the penetration of toxic chemicals or biologic agents.

The garments and laminates comprise;
1) a non-absorbing microporous thermoplastic outer layer which provides a barrier against liquids that are generally a concentration of hazardous material. The outer layer spreads the liquid and slows or stops liquid penetration into the garment;
2) a first non-woven scrim layer is provided which can be impregnated with anti-biological agents or reactive agents for the toxic chemicals;
3) a microporous thermoplastic layer bonded to said first scrim layer which can optionally be impregnated with an anti-microbial agent or a chemical reactive agents;
4) a second non-woven thermoplastic scrim layer which has been treated with the agent not found in the first scrim layer;
5) a microporous thermoplastic layer encasing said second scrim layer, and
6) optionally, tie layers.

Additional protective layers may be used which are attached between the different layers by use of discontinuous adhesive bonding, thermal bonding, point bonding, ultrasonic bonding, and the like so as to maintain an air gap to allow breathability but also to spread the toxic substance and slow its penetration. The additional layers may be treated with the anti microbial agents and/or the reactive chemical agents.

It is a general object of the invention to provide breathable protective garments against hazardous chemical and biological agents.

It is another object of the invention to provide self decontaminating protective garments.

It is yet another object of the invention to provide a reactive interlayer of a garment to tie up and fix the toxic chemical or warfare agent and change it irreversibly to a relatively non-toxic form not requiring decontamination.

DESCRIPTION OF THE PREFERRED EMBODIMENTS

The present invention provides for breathable protective garments and laminates against hazardous chemical and biological agents including warfare agents. According to the invention there is provided garments which have different layers to slow the permeation of the hazardous or toxic agents and to provide means to decontaminate the toxic agent. The garments and laminates comprise;

1) a non-absorbing outer layer which is a barrier against liquids that generally contain a concentration of hazardous agents. The outer layer spreads and stops or slows gaseous penetration into the garment;

2) a first scrim layer which comprises anti-biological agents or reactive agents for toxic chemicals;
3) a microporous layer bonded to said first scrim layer which can be optionally impregnated with anti-microbial or chemical reactive agents;
4) a second scrim layer which has been treated with the agent not found in the first scrim layer;
5) a microporous layer encasing said second scrim layer;
6) optionally tie layers. Suitable tie layers are linear low density polyethylene (LLDPE), metallocene and ethyl vinyl acetate (EVA) which readily heat seal using ultrasonic welding or thermal welding.

Non absorbing outer layers include polyethylene vinyl alcohol (EVOH), nylon, ionomers (SURLYN®) and polyethylene terephtalate (PET). The outer layer is preferably about 1-3 mils, and is less than 1.0 oz/yd$^2$.

The first scrim is a non-woven fabric prepared by spunbonding, meltblowing and spunlacing techniques which are known in the art. For example, U.S. Pat. No. 4,405,297 discloses a spunbonding process and U.S. Pat. No. 3,978,185 discloses a meltblowing process, both of which are incorporated herein by reference in their entirety.

The non-woven fibers can be composed of but not limited to, polyester, polyethylene/acrylic copolymer, cellulosics, nylon, polypropylene, polyethylene, or any combination of fibers. The non-woven fabric can be impregnated with anti-microbial agents, for example the phenol complexes disclosed in patent application Ser. No. 11/711,272 of Lezdey which penetrates into the fibers, TRICLOSAN® or polyamine.

Other anti-microbial compounds can be used which plate the fibers and form the anti-microbial barrier.

The other scrim which is used as a chemical barrier to stop and/or decontaminate toxic agents such as nerve gas and/or mustard gas are organic amines including polyamines such as triethylene tetramine and polymers containing the amine, for example, polyamine/quaternary amine acrylates/polyethylene. These polymers can be extruded and laminated to the scrims.

The polyamines can also be incorporated into the barrier layers or scrim fibers which have an acrylic acid or methacrylic acid content.

The polyamines can be used against nerve agents such as Sarin, Tabu and Soman. They further react with halogen compounds such as mustard gas, phosphoric nerve gas and irreversibly with acidic chemicals and gases from sulfur dioxide, chlorine, bromine, hydrogen sulfide, carbon dioxide, hydrogen fluoride and acetic acid.

Besides being impregnated with anti-microbial or anti-chemical agents the scrims can be coated or plated with ammonium salts, and/or reducing agents or salts such as zinc, cuprous and ferrous salts.

The inner microporous barrier layers can be a single layer or a laminate which is liquid impervious or pathogen impervious. That is the layers are a barrier to various liquids, particularly body fluids or liquids bearing bacterial and/or viral pathogens. Exemplary liquids include blood, water, oil, alcohol and mixtures thereof. Exemplary pathogens include hepatitis B and C virus, HIV, Phi X174 bacteriophage, and the like.

Preferably, the barrier can prevent passage of any virus greater than 25 mm from penetrating there-through while maintaining a favorable MVTR.

The inner bather layer can be a thermoplastic layer of film which has been treated with an anti-microbial agent or an anti-toxic chemical agent provided it is still breathable. After treatment, breathability may be restored by micropunching or stretching in a machine direction oriented method so as to keep the pores open during lamination. Preferably, the microporous layer is bonded to the scrim by use of a minimum amount of adhesive such as by small beads or discontinuous lines.

The inner layers are preferably a thermoplastic layer of film such as EVOH, polyolefin, polyester, polyetherester, polyamide, ionomer, and polyamide.

Suitable polyester is polyethylene terephthalate, polyamide is nylon, polyolefin is polyethylene and ionomer is Surlyn® or TYVEK®.

The outer most layer is most preferable for achieving the objects of the invention is in order of preference, EVOH, polyethylene terephthalate, nylon and ionomer.

It is understood that the outer layer can also be treated with an anti-microbial agent and/or an anti-toxic chemical agent.

Linear low density polyethylene can be used as a tie layer for the different garments. Also the garments can be seamed using non-breathable thermoplastics.

The breathable layer(s) has a thickness of about 0.01 to 1.5 mils and the preferred weight of the breathable layer(s) is from about 0.1 to about 2 oz/sq. yd. Preferably, the breathable layer(s) has a surface energy of less than about 75 dynes/cm and preferably less than about 50 dynes/cm. Surface energy is important in that the lower the surface energy, the less likely that significant wetting of the resulting fabric will occur thereby reducing the risk of soak through or wicking. The resulting laminate should exhibit no visible penetration of synthetic blood when subjected to contact with synthetic blood at zero psi for 5 minutes followed by synthetic blood contact at 2 psi (13.6 kPa) for one minute followed by synthetic blood contact at zero psi for 54 minutes according to ASTM-F-1670. Likewise, the resulting laminate should exhibit no viral penetration when tested per ASTMF-1671 wherein the laminate is contacted with 0.0 slashed X174 bacteriophage suspension at a titer of 10 sup8 PFU/ml for five minutes with no applied pressure, then 1 minute at 2 psi, then 54 minutes at no applied pressure.

The present invention involves using a chemically reactive or complexing interlayer which can be in many forms. The purpose of this reactive inter layer is to actually tie up and fix the toxic chemical or warfare agent chemically and change it irreversibly to a relatively non toxic form. The suit may therefore be worn until the protective agent is used up which by experience will take a lot longer than the needed service time. These suits would be disposable but can be worn again since they do not need to be decontaminated and are safe. The reactive layer can be used alone in the suit or in combination with several types of reactive layers and even with absorptive carbon layers. (Tradename Proreact, Proreactive).

These protective suits with the reactive layers can be breathable or totally non-breathable depending on the application. When the suit is breathable the reactive layer can be adjusted with the breathable layers to permit more air flow (evaporative cooling) through the suit. The best way to make the reactive layer work is to use it as a non-woven layer which is impregnated with or carries the reactive materials. This permits equilibration of gases along the layers of the non-woven scrim of the garment within the reactive inner layer of any small
areas of intense contamination which could overwhelm any reactive layer such as direct liquid drops which will happen in chemical warfare attacks. (These warfare agents are actually volatile liquids which are sprayed or splashed across a wide area).

EXAMPLE 1

Preparation of Anti-Microbial Agent

Following the procedure in U.S. patent application Ser. No. 11/711,272, 0.6% by weight of succinic acid was added to react with 0.6% by weight of phenol in an alcohol water solution.

In a separate vessel, o-phenylphenol in alcohol/water solution was dissolved 0.4% by weight and a 0.4% by weight Adogen (or another antimicrobial diamine) was reacted with the o-phenylphenol.

The two solutions were combined.

The barrier layers can be sprayed or immersed in the anti-microbial solution and then dried.

If desired, the fabric can be pretreated with polyacrylic acid to provide a water insoluble anchor.

EXAMPLE 2

3.0 mil layer of EVOH that is treated with the anti-microbial of Example 1 is adhered to 3.0 mil layer of dry/melt blown polyethylene terephalate which had been treated with the anti-microbial of Example 1 which also contained the polyamines. The layers are adhered by point bonding. A 1.0 mil layer of LLDPE tie layer is adhered to the polyethylene terephthalate with a further layer being 2.0 mil nylon non-woven scrim layer which was treated with a polyamine. A 1.0 mil layer of LLDPE is adhered to the bottom layer.

EXAMPLE 3

Following the procedure of Example 2, the following laminates were prepared:

1. LLDPE/EVOH/LLDPE/needle punched polyester/PET/LLDPE
2. LLDPE/EVOH/LLDPE/melt blown PET/LLDPE/LLDPE
3. LLDPE/Nylon/LLDPE/needle punched PET/PET Each of the film layers were treated with the antimicrobial of Example 1 and each of the scrim layers were treated with the anti-microbial and the polyamine. The LLDPE was used as a binding layer and adhered by point bonding.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. Breathable chemical and biological agent protective garments and laminates comprising;
   A) a non-absorbing thermoplastic top or outer layer of less than 1.0 oz/yd$^2$ in weight which provides a barrier against toxic liquids and slows gaseous penetration;
   B) a first non-woven scrim layer which has been impregnated with an agent selected from the group consisting of at least one of anti-microbial agent and anti-toxic chemical agent,
   C) a microporous thermoplastic layer having a surface energy of less than 75 dynes/cm bonded to said first scrim layer by a minimum amount of adhesive whereby an air gap is provided;
   D) a second non-woven thermoplastic scrim layer which has been impregnated with an agent selected from the group consisting of anti-microbial agent and anti-toxic chemical agent, and
   E) an intermediate microporous thermoplastic layer encasing said second scrim layer.

2. The protective garments and laminates of claim 1 wherein said outer layer is selected from the group consisting ethylene vinyl alcohol, nylon, ionomer and polyester.

3. The protective garments and laminates of claim 1 wherein said first scrim layer is impregnated with an anti-microbial agent selected from the group consisting of phenolic complex and a polyamine.

4. The protective garments and laminates of claim 3 wherein said polyamine is triethylene tetramine.

5. The protective garments and laminates of claim 1 wherein said first and second scrim layers are selected from the group consisting of spun bonded, melt blown and spun-laced thermoplastics.

6. The protective garments and laminates of claim 5 wherein said first and second scrim layers are selected from the group consisting of polyester, cellulosic, nylon, polypropylene and polyethylene.

7. The protective garments and laminates of claim 1 wherein said microporous thermoplastic layer of part C) is selected from the group consisting of nylon, polyethylene terephthalate, ethylene vinyl alcohol and ionomer.

8. The protective garments and laminates of claim 1 wherein said second non-woven thermoplastic scrim layer is impregnated with a different agent from that in said first non-woven scrim layer.

9. The protective garments and laminates of claim 1 wherein said scrim layers are plated with anti-microbial salts or powders.

10. The protective garments and laminates of claim 1 wherein said microporous thermoplastic layer of part E) is selected from the group consisting of ethylene vinyl alcohol, nylon, ionomer and polyester.

11. The protective garments and laminates of claim 10 wherein said polyester is polyethylene terephthalate.

12. The protective garments and laminates of claim 1 wherein said outer layer has a tie layer comprising linear low density polyethylene.

13. The protective garments and laminates of claim 1 wherein the layers are attached by a process selected from the group consisting of discontinuous adhesive bonding, point bonding, thermal bonding and ultrasonic bonding.

14. The protective garments and laminates of claim 1 which have tie layers.

15. The protective garments and laminates of claim 1 which are self-decontaminating.

16. A breathable chemical and biological agent protective garment comprising;
   a) a top layer of a thermoplastic of less than 1.0 oz/yd$^2$ in weight selected from the group consisting of ethylene vinyl alcohol, nylon and polyethylene terephthalate which is a barrier against toxic substances;

b) a first non-woven scrim layer bonded to said top layer having incorporated therein at least one of an antimicrobial agent or an anti-toxic chemical agent, said scrim being melt blown, spunbonded or spunlaced thermoplastic;

c) a breathable microporous thermoplastic layer having a surface energy of less than 75 dynes/cm selected from the group consisting of ethylene vinyl alcohol, nylon, ionomer and polyethylene terephthalate bonded to said first scrim layer so as to provide an air gap to slow gaseous penetration, and d) a second non-woven scrim layer bonded to said microporous thermoplastic layer to provide an air gap having incorporated therein an anti-microbial agent and anti-toxic chemical agent which is not incorporated in said first scrim layer;

e) a microporous thermoplastic layer bonded to said second non-woven scrim layer, and f) a chemically reactive inner layer to tie up and fix toxic chemicals.

17. The protective garment of claim 16 which is self-decontaminating.

* * * * *